United States Patent [19]

Schmidt

[11] Patent Number: 4,867,933

[45] Date of Patent: Sep. 19, 1989

[54] METHOD FOR REPAIRING PLASTIC FISHING BAIT

[76] Inventor: Ralph J. Schmidt, 18048 Manchester Rd., Glencoe, Mo. 63038

[21] Appl. No.: 179,666

[22] Filed: Apr. 11, 1988

[51] Int. Cl.$^4$ .................. B29C 35/00; B29C 59/00; A01K 85/00
[52] U.S. Cl. .................................... 264/36; 264/322; 425/12; 156/94; 43/42.53; 29/402.21
[58] Field of Search ................ 264/36, 239, 322, 296, 264/320; 425/11, 12; 156/94; 43/4.5, 42.53; 29/402.21

[56] References Cited

U.S. PATENT DOCUMENTS

| | | | |
|---|---|---|---|
| 1,118,596 | 11/1914 | Spriggs | 425/11 |
| 3,044,920 | 7/1964 | Dewar | 425/11 |
| 3,514,358 | 6/1968 | Monaghan | 264/245 |
| 4,019,014 | 4/1977 | Byrne | 264/36 |

Primary Examiner—Jan H. Silbaugh
Assistant Examiner—Kelley M. Sidwell
Attorney, Agent, or Firm—Senniger, Powers, Leavitt and Roedel

[57] ABSTRACT

A method for repairing a hook hole in a piece of plastic bait. The method including the steps of heating a tip, inserting the heated tip into the hook hole in a piece of plastic bait, holding the heated tip in the hook hole for sufficient time to melt the plastic in the marginal edges of the hole, removing the heated tip from the hole, and compressing the plastic bait in the region of the hole to close the hole. The apparatus for repairing the hook hole in a piece of plastic bait including a handle, a tip extending from the handle, the tip sized to be insertable into the hook hole in a piece of plastic bait; and means for heating the tip to a sufficient temperature so that when the tip is inserted in the hook hole in the plastic bait, it melts enough plastic in the marginal regions around the hook hole that the hole can be closed when the tip is removed.

10 Claims, 1 Drawing Sheet

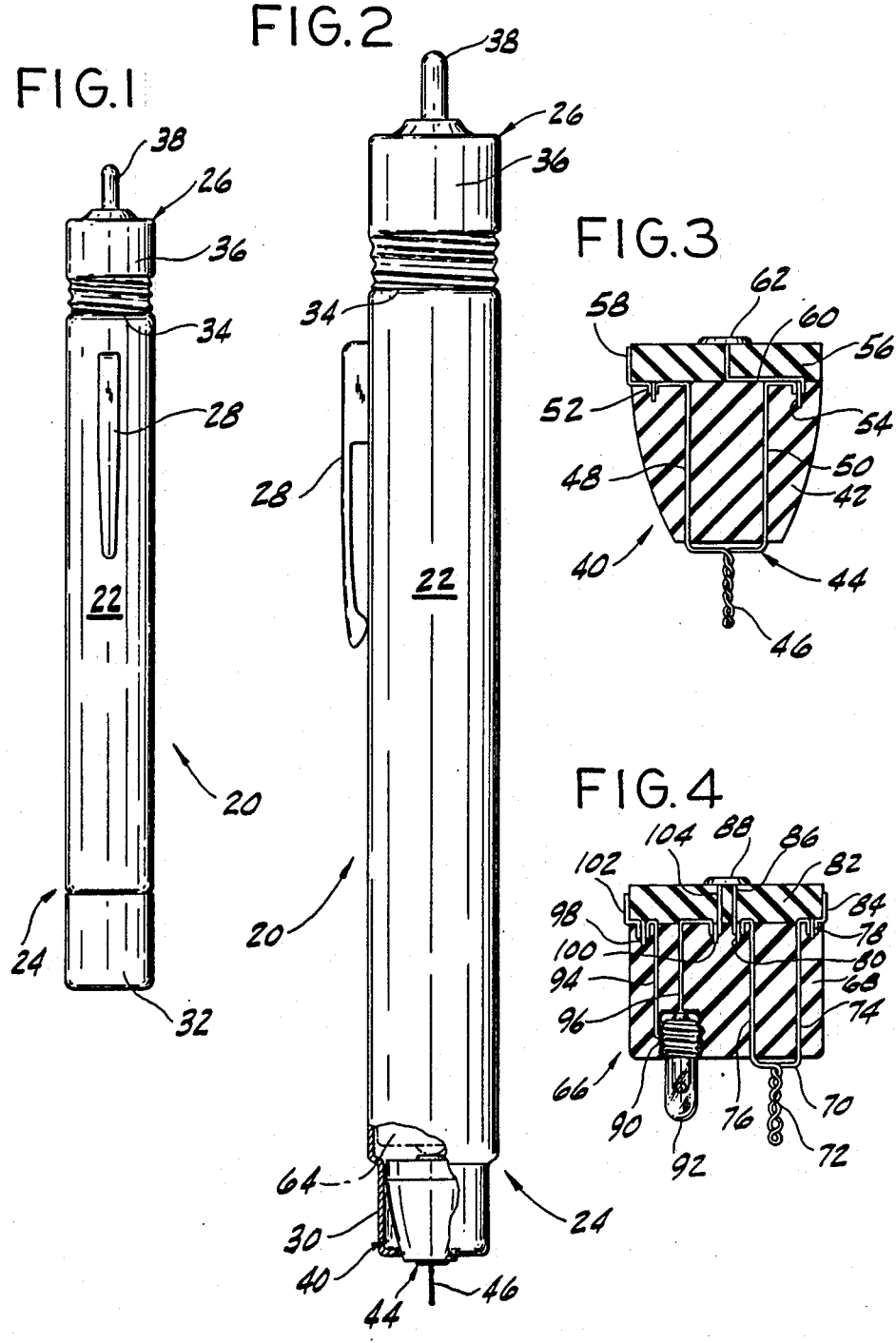

METHOD FOR REPAIRING PLASTIC FISHING BAIT

BACKGROUND OF THE INVENTION

This invention relates to fishing equipment and in particular to a method and apparatus for repairing plastic fishing bait.

Various types of plastic worms and other creatures have been made for use as fishing bait. This plastic bait offers several advantages including ready availability and easy storage and handling. Each fisherman develops his or her own special techniques for inserting a fishing hook through the plastic bait so that the appearance and movement of the bait in the water attracts fish. The plastic bait generally must be hooked on the hook in a particular position because improperly hooked bait will not be as effective in attracting fish. After just a few uses the holes in the bait through which the hook extends become enlarged, and the bait can no longer hold its proper position on the hook. In the past, once this happened the bait was useless and had to be discarded and replaced with a new piece. This presented a disposal problem for the fisherman. Furthermore, it meant that the fisherman generally had to carry a large supply of plastic bait, which was both expensive and cumbersome.

SUMMARY OF THE INVENTION

It is among the objects of the present invention to provide a method and apparatus for the quick and easy repair of plastic bait so that it can be reused; it is further an object to provide such a method and apparatus that can be used in the field, while fishing. It is also among the objects of at least some embodiments to provide an apparatus that can be used in the dark and that provides a warning signal that the apparatus is on.

Generally, the method of the present invention comprises inserting a heated tip into the enlarged hole in the plastic bait, holding the heated tip in the hole in the bait for sufficient time to melt the plastic in the marginal edges of the hole, removing the heated tip, and compressing the plastic bait in the region of the hole to close the hole.

Generally, the apparatus of the present invention comprises a handle having a tip extending therefrom. The tip is sized to be insertable into a hookhole in a piece of plastic bait. The apparatus further comprises means for heating the tip to a temperature sufficient to melt plastic. The apparatus is lightweight and compact enough to be portable, and preferably small enough to be held in one hand for easy use. The apparatus preferably has an internal power source for heating the tip, such as batteries, so that the apparatus can be used in the field, while fishing.

In an alternate embodiment of the apparatus, a light bulb is connected in parallel to provide light when the tip is heated to facilitate use of the apparatus in the dark and to provide a warning signal that the apparatus is on.

These and other advantages will be in part apparent and in part pointed out hereinafter.

BRIEF DESCRIPTION OF THE DRAWINGS

FIG. 1 is a side elevation view of a plastic bait repair apparatus constructed according to the principles of this invention;

FIG. 2 is an enlarged side elevation view of the apparatus, rotated 90°, with portions of the bottom end broken away to show the interior;

FIG. 3 is an enlarged cross-sectional view of the heating unit in the bottom end, showing the details of construction; and FIG. 4 is an enlarged cross-sectional view of an alternate embodiment of the heating unit in the bottom end, including a light bulb.

Corresponding reference numerals indicate corresponding parts throughout the several views of the drawings.

DETAILED DESCRIPTION OF THE PREFERRED EMBODIMENTS

A plastic fishing bait repair apparatus constructed according to the principles of the present invention, and adapted for use in the method of the present invention, is indicated generally as 20 in FIGS. 1 and 2. The repair apparatus 20 comprises a handle in the form of a generally cylindrical casing 22 having bottom end 24 and a top end 26. The casing may be made of metal or other suitable material. The casing 22 is preferably sized to receive two standard 1.5 volt size double A batteries, although the apparatus could be constructed for use with some other size batteries. The apparatus 20 is preferably provided with a pocket clip 28 for convenient and secure storage in a pocket when the apparatus is not in use.

The casing 22 tapers at the bottom end to form a section 30 of reduced diameter, as shown in FIG. 2. As shown in FIG. 1, an open ended cover 32 is adapted to fit over the exterior of section 30, to protect the bottom end of the apparatus. The casing 22 has integral threads 34 in its top end 26. A cap 36 is threaded over the top end 26 of the casing 22. The cap 36 has a switch 38 operable to electrically connect the batteries received in the casing to the casing as is known to a person of ordinary skill in the art.

A heating unit 40 is received inside the section 30 of the casing 22. The heating unit 40 comprises a generally bullet-shaped support 42 made from an insulating material. As shown in FIG. 3, a high resistance heating element 44 is mounted in the support. The element 44 comprises a twisted coiled tip 46 projecting from the front of the support 42, and two leads 48 and 50 extending through the support to the back surface. Each of these leads extends to a brass terminal 52 and 54, respectively, on the back surface of the support 42. A spacer 56 made from an insulating material covers the back of the support 42.

The heating element 44 may be made from any high resistance material conventionally used in heat producing appliances, for example nichrome wire. When a voltage is applied over the heating element, a current flows therein and the heating element heats up. However, because a portion of the heating element 44 is twisted on itself to form tip 46, the tip 46 is short circuited and therefore current does not pass through the tip and the tip does not heat from electrical resistance. However, the heat from the element 44 is readily conducted to the tip which therefore heats to a moderate temperature sufficient to melt the plastic without burning.

A first connector 58 connects the terminal 52 to the casing 22. A second connector 60 connects the terminal 54 to a conductive button 62 on spacer 56. Button 62 is sized and positioned to contact the positive terminal of the bottom most of a pair of conventional double A batteries 64 received in the casing.

An alternate embodiment of heating unit 40 is indicated as 66 in FIG. 4. The heatiang unit 66 is similar in construction to unit 40, comprising a support 68 made from an insulating material. A high resistance heating element 70 is mounted in the support. The element 70 comprises a twisted or coil tip 72, similar to tip 46 described above, projecting from the front of the support 68, and two leads 74 and 76 extending through the support to the back surface. Each of these leads extends to a brass terminal 78 and 80, respectively, on the back surface of the support 68. A spacer 82, also made from an insulating material, covers the back of the support 66.

The heating element 70, like heating element 44, may be made from any high resistance material conventionally used in heat producing appliances, for example nichrome wire. A first connector 84 connects the terminal 78 to the casing 22. A second connector 86 connects the terminal 80 to a conductive button 88 on spacer 82. Button 86 is sized and positioned similar to button 62 to contact the positive terminal of a received in the casing.

The heating unit 66 also includes a light bulb socket 90 for receiving a small light bulb 92 of the type generally used in penlight flashlights. Two leads 94 and 96 extend from the socket 90 through the support 68 to the back surface. Each of these leads extends to a brass terminal 98 and 100, respectively, on the back surface of the support 68. A third connector 102 connects the terminal 98 to the casing 22. A fourth connector 102 connects the terminal 100 to the conductive button 88 on spacer 82. The heating element 70 and the light bulb 92 are thus connected in parallel so that when the switch 38 is operated to the on position to connect the negative terminal of the batteries 66 to the casing, the heating element 70 and the light bulb 92 are energized simultaneously. The light bulb 92 provides light for using the apparatus and also serves as an indicator that the switch 38 is in the on position.

OPERATION

The apparatus is prepared for use by inserting a pair of size double A batteries in series in the casing 22, with the positive terminal of the bottommost battery in contact with button 62 and the negative terminal of the uppermost battery in contact with the cap 36. When it is desired to repair a piece of plastic bait, the switch 38 is operated to connect the negative terminal of the battery to the casing to complete the electrical circuit between the battery and the heating element 44. The current passing through the element 44 heats the element 44. This heat is conducted to integral tip 46, heating the tip 46 to a temperature sufficient to melt plastic. The heated tip 46 of the element 44 is inserted into a hole or cut in the piece of plastic bait and held there for sufficient time for the plastic in the marginal regions around the hole or cut to melt. The tip 46 is then removed, and switch 38 operated to the off position. The sides of the piece of plastic bait adjacent the hole or cut are compressed to repair the hole or cut. The protective cap 32 can be placed over the bottom end 24 to help shield the hot tip 46 until it cools.

In a apparatus with the heating unit 66 of the alternate embodiment, the operation is substantially the same. However, the light bulb 92 provides illumination for use of the apparatus in the dark, and provides a warning signal that the apparatus is in the on position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method of repairing a hook hole in a piece of plastic bait, the method comprising the steps of:
   heating a tip;
   inserting the heated tip into the hook hole in the piece of plastic bait;
   holding the heated tip in the hook hole for sufficient time to melt the plastic in marginal regions around the hole;
   removing the heated tip from the hole; and
   compressing the plastic bait at the sides adjacent the hole so that melted marginal edges of the hole adhere together to close the hole.

2. The method according to claim 1 wherein the heated tip is heated by conduction from an electric resistance heating element.

3. The method according to claim 2 wherein the step of heating the tip comprises electrically connecting a heating element to a battery to heat the element, the heat from the element heating the tip.

4. The method according to claim 1 wherein the heated tip is heated by electric resistance.

5. The method according to claim 4 wherein the step of heating the tip comprises electrically connecting the tip to a battery to heat the tip by electrical resistance.

6. A method of repairing a hook hole in a piece of plastic bait, the method comprising the steps of:
   inserting a tip into the hook hole in the piece of plastic bait;
   heating the tip;
   holding the heated tip in the hook hole for sufficient time to melt the plastic in marginal regions around the hole;
   removing the heated tip from the hole; and
   compressing the plastic bait of the sides adjacent the hole so that melted marginal edges of the hole adhere together to close the hole.

7. The method according to claim 6 wherein the heated tip is heated by conduction from an electric resistance heating element.

8. The method according to claim 7 wherein the step of heating the tip comprises electrically connecting a heating element to a battery to heat the element, the heat from the element heating the tip.

9. The method according to claim 6 wherein the heated tip is heated by electric resistance.

10. The method according to claim 9 wherein the step of heating the tip comprises electrically connecting the tip to a battery to heat the tip by electrical resistance.

* * * * *